US012783789B2

(12) United States Patent
Pande et al.

(10) Patent No.: US 12,783,789 B2
(45) Date of Patent: Nov. 3, 2026

(54) SYSTEMS AND METHODS TO ASSIST IN USER TARGETED CONTENT COMPOSITION USING CONTENT READABILITY INFORMATION

(71) Applicant: Open Text Inc., Menlo Park, CA (US)

(72) Inventors: Vaibhav Pradip Pande, Amravati (IN); Lakshmi Prasannam Chinnam, Hyderabad (IN)

(73) Assignee: Open Text Inc., Menlo Park, CA (US)

( * ) Notice: Subject to any disclaimer, the term of this patent is extended or adjusted under 35 U.S.C. 154(b) by 145 days.

(21) Appl. No.: 17/462,762

(22) Filed: Aug. 31, 2021

(65) Prior Publication Data

US 2022/0083725 A1 Mar. 17, 2022

Related U.S. Application Data

(60) Provisional application No. 63/078,812, filed on Sep. 15, 2020.

(51) Int. Cl.
*G06F 40/166* (2020.01)
*G06F 9/445* (2018.01)
*G06F 9/451* (2018.01)
*G06F 40/216* (2020.01)
*G06F 40/253* (2020.01)

(52) U.S. Cl.
CPC ........ *G06F 40/166* (2020.01); *G06F 9/44526* (2013.01); *G06F 9/453* (2018.02)

(58) Field of Classification Search
None
See application file for complete search history.

(56) References Cited

U.S. PATENT DOCUMENTS

| | | | | | |
|---|---|---|---|---|---|
| 6,128,634 | A * | 10/2000 | Golovchinsky | G06F 40/284 | 707/999.003 |
| 7,346,489 | B1 * | 3/2008 | Bever | G06F 40/117 | 704/4 |
| 2008/0162275 | A1 * | 7/2008 | Logan | G06F 16/951 | 705/12 |
| 2011/0313757 | A1 * | 12/2011 | Hoover | G06F 40/205 | 704/9 |
| 2013/0268490 | A1 * | 10/2013 | Keebler | G06F 16/954 | 707/627 |
| 2018/0211265 | A1 * | 7/2018 | Natarajan | G06Q 30/0202 | |

(Continued)

*Primary Examiner* — Mustafa A Amin
(74) *Attorney, Agent, or Firm* — Sprinkle IP Law Group

(57) ABSTRACT

Systems, methods and products for assisting an author in targeting content to a desired audience. In one embodiment, a content readability plug-in is installed in an authoring tool. The author identifies a desired level of readability, type of communication or audience, from which the plug-in determines a desired level of readability. As the author creates content using the authoring tool, the plug-in examines the content and assesses its readability using readability indexing techniques embodied in a readability index library. The plug-in then provides feedback to the author which indicates the readability, and may provide suggestions for improving the readability of the content. The plug-in may provide feedback in real time as the content is being generated, or it may examine and assess a completed body of content. The author can then revise the content based on the feedback to achieve a readability level suited to the target audience.

20 Claims, 7 Drawing Sheets

(56) References Cited

U.S. PATENT DOCUMENTS

| | | | | |
|---|---|---|---|---|
| 2019/0114300 | A1* | 4/2019 | Miltsakaki | G06F 40/216 |
| 2020/0073936 | A1* | 3/2020 | Jankowski | G06F 40/30 |
| 2020/0380075 | A1* | 12/2020 | Boada | G06F 18/22 |
| 2021/0365638 | A1* | 11/2021 | Cougias | G06F 40/30 |
| 2022/0188514 | A1* | 6/2022 | Thota | G09B 5/02 |
| 2022/0253509 | A1* | 8/2022 | Cascaes | G06F 16/9566 |

* cited by examiner

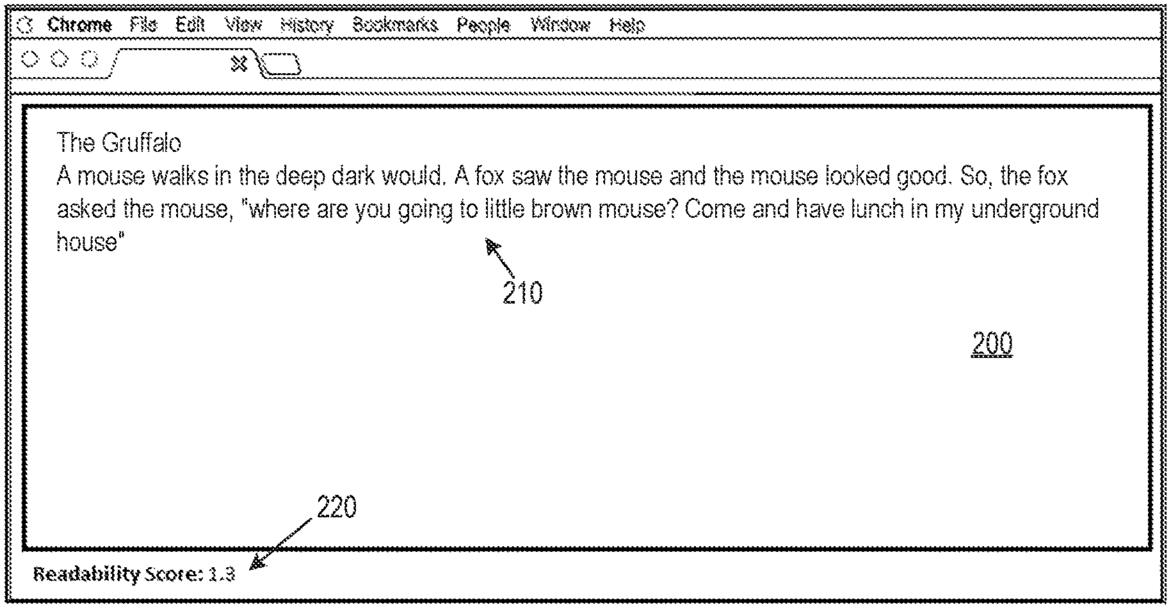

FIG. 2A

But who is this terrible creature with terrible claws. And terrible teeth in his terrible jaws?
He has knobby knees and turned-out toes. And a poisonous wart at the end of his nose. His eyes are orange, his tongue is black; He has purple prickles all over his back.

Readability Score: 6.1

FIG. 2B

Nearly 10 years had passed since the Dursleys had woken up to find their nephew on the front step, but Privet Drive had hardly changed at all. The sun rose on the same tidy front gardens and lit up the brass number four on the Dursley's front door. It crept into their living room, which was almost exactly the same as it had been the night when Mr. Dursley had seen that fateful news report about the owls. Only the photographs on the mantelpiece really showed how much time had passed. Ten years ago, there had been lots of pictures of what looked like a large pink beach ball wearing different colored bonnets – but Dudley Dursley was no longer a baby, and now the photographs showed a large blonde boy riding his first bicycle, on a carousel at the fair, playing a computer game with his father, being hugged and kissed by his mother. The room held no sign at all that another boy lived in the house, too.

Readability Score: 6.1

FIG. 2C

The Jurassic Park
Bowman, a thirty-six-year-old real estate developer from Dallas had come to Costa Rica with his wife and daughter for a two-week holiday. The trip had actually been his wife's idea, for weeks Ellen had filled his ear about the wonderful national parks of Costa Rica, and how good it would be for Tina to see them. Then, when they arrived it turned out Ellen had an appointment to see a plastic surgeon in San Jose. That was the first Mike Bowman had heard about the excellent and inexpensive plastic surgery available in Costa Rica, and all the luxurious private clinics in San Jose.

Readability Score: 6.1

FIG. 2D

SYSTEMS AND METHODS TO ASSIST IN USER TARGETED CONTENT COMPOSITION USING CONTENT READABILITY INFORMATION

RELATED APPLICATIONS

This application claims priority under 35 U.S.C. § 119(e) to U.S. Provisional Application No. 63/078,812, filed Sep. 15, 2020, entitled "Systems and Methods to Assist in User Targeted Content Composition Using Content Readability Information", which is fully incorporated herein by reference for all purposes.

TECHNICAL FIELD

This disclosure relates generally to content authoring, and more particularly to systems and methods for assisting content authoring using readability assessment tools and artificial intelligence tools to provide suggestions or recommendations for the improvement of content generated by a user.

BACKGROUND

Textual content is intended to communicate information to a particular audience. Depending upon the situation, the audience may have various different levels of reading skills. For instance, if the audience is primarily children, their reading skills may not be very well developed, so content written for this audience should be relatively simple and easily understood. If, on the other hand, the audience is a community of academics to whom a peer-reviewed article is being presented, their reading skills are expected to be highly developed, so the article should be written in a manner that is more detailed and precise. If the readability of the content does not match the abilities of the audience, the information contained in the content may not be effectively communicated to the audience.

It is commonly the case, however, that an author must simply keep in mind the reading skills of an intended audience and must manually determine the readability of the content that is being generated. This may be a difficult task, and it is not uncommon for the readability of generated content to be mismatched with the intended audience. Further, it is not uncommon for the readability of the content to be inconsistent, so that portions of the content are more easily read, while others are more difficult.

It would therefore be desirable to provide systems and methods for determining the readability of the content that is being generated by the author and providing information to the author which allows the author to adjust the readability of the content as it is being created. Additional information is provided below and in Appendix A, which is attached.

SUMMARY

The present disclosure details systems, methods and products for assisting an author in the generation or modification of content to improve the author's ability to target the content to a desired audience. In one embodiment, a content readability plug-in (which may be referred to herein as a CRP, or as a plug-in) is installed in an authoring tool. The author identifies a desired level of readability, or indicates a type of the content or an audience for the content, from which the plug-in can determine a desired level of readability. As the author creates content using the authoring tool, the plug-in examines the content and assesses its readability using readability indexing techniques embodied in a readability index library. The plug-in then provides feedback to the author which indicates the readability. The plug-in may also provide suggestions for improving the readability of the content. The plug-in may provide feedback to the author in real time as the content is being generated, or it may examine and assess a completed body of content. The author can then revise the content if needed based on the feedback from the plug-in to achieve a level of readability that is suited to the target audience.

One embodiment comprises a method for assisting content composition using content readability information. The method includes receiving initial textual content in an authoring tool and providing this textual content to a content readability plug-in coupled to the authoring tool. A request is then provided from the content readability plug-in to a content readability server, the request identifying the initial textual content. The content readability server accesses a content readability library to generate a content readability index or score corresponding to the initial textual content. The content readability server then provides input information to an artificial intelligence engine, the input information including the initial textual content, the generated content readability index and content target information. The artificial intelligence engine analyzes the received input information, generating a content recommendation corresponding to the initial textual content, where the content recommendation is generated based on the received input information, and returning the content recommendation to the content readability server. The content readability server then provides the content recommendation to the content readability plug-in, and the content readability plug-in displays the content recommendation to a user of the authoring tool.

In some embodiments, the content readability plug-in generates a readability interface that is presented within an editing interface of the authoring tool. The readability interface may display a readability index value of the initial textual content with the corresponding content recommendation. The content recommendation may comprise user guidance.

In some embodiments, the content readability plug-in displays the content recommendation to the user of the authoring tool in real time. The user may type in the initial textual content via an editing interface of the authoring tool, where the content readability plug-in displays the content recommendation to the user of the authoring tool in response to the user typing the initial textual content.

In some embodiments, the content readability plug-in provides a set of user-selectable buttons that are activatable by a user to cause corresponding actions which may include replacing the initial textual content with replacement text, adding recommended text to the initial textual content, and editing the initial textual content.

In some embodiments, the content target information may include an indicator of a target audience, and/or an indicator of a communication type.

In some embodiments, the content readability library may implement a Flesch-Kincade index and/or a Gunning-Fog Index. The content readability index may comprise a numerical value indicative of the initial textual content's readability.

One alternative embodiment comprises a computer program product comprising a non-transitory computer-readable medium that stores instructions executable by one or more processors. The instructions may be executable to perform a method as described above.

Another alternative embodiment comprises a system for assisting content composition using content readability information. In this embodiment, the system comprises a content readability plug-in, an authoring tool, a content readability server, a content readability library, and an artificial intelligence engine. The content readability plug-in is coupled to the authoring tool, and is adapted to receive initial textual content. The content readability server is coupled to receive a request from the content readability plug-in, the request identifying the initial textual content. The content readability library is coupled to the content readability server, and the content readability server is adapted to access the content readability library to generate a content readability index corresponding to the initial textual content. The artificial intelligence engine is coupled to the content readability server, where the content readability server is adapted to provide input information to the artificial intelligence engine, the input information including the initial textual content, the generated content readability index and content target information. The artificial intelligence engine is adapted to analyze the received input information, generate a content recommendation corresponding to the initial textual content where the content recommendation is generated based on the received input information, and return the content recommendation to the content readability server. The content readability server is adapted to provide the content recommendation to the content readability plug-in, and the content readability plug-in is adapted to generate a user interface display in the authoring tool containing the content recommendation.

Numerous alternative embodiments may also be possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

FIGS. 2A-2D are diagrams examples of a display for an editor using a content readability plug-in in accordance with some embodiments

DETAILED DESCRIPTION

Figure 1:
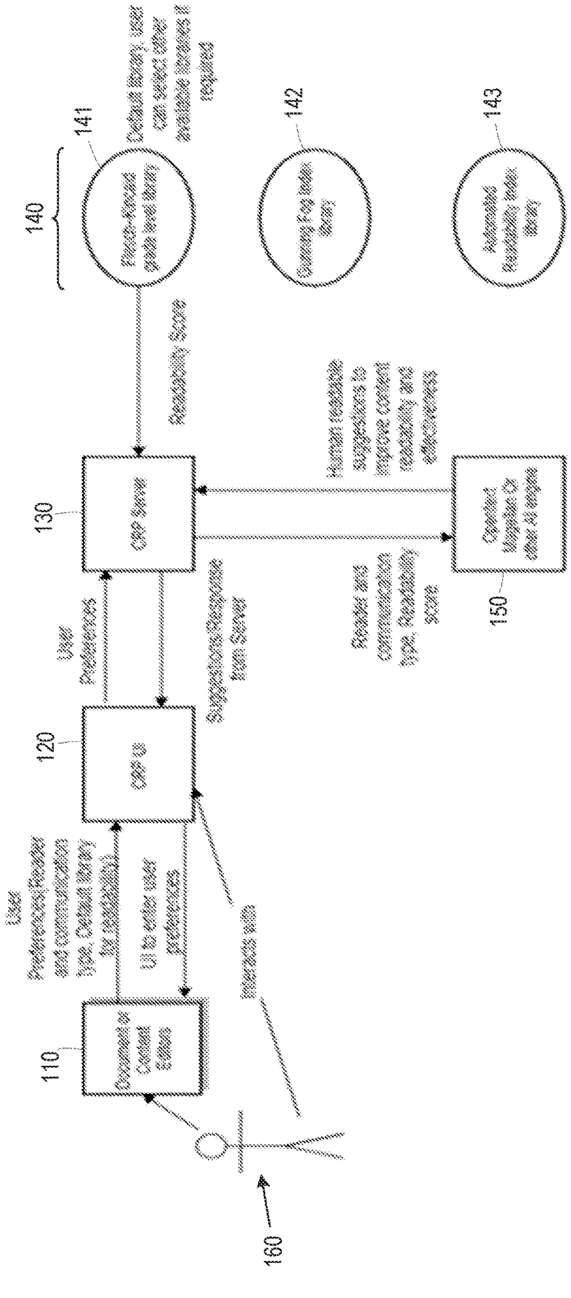
FIG. 1 is a diagram illustrating the structure of a system for enhancing the readability of content in accordance with some embodiments.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

When an author is creating textual content, they may express the ideas they intend to communicate in many different ways. The same idea can be communicated using more or fewer words, simple or more complex words, shorter or longer sentences, simpler or more complex words, simpler or more complex sentence structure, and so on. The author's choices with respect to these different factors affect the readability of the resulting textual content. For example, shorter sentences using simpler words are generally more readable than longer sentences using more complex words.

Readability may also be affected by factors such as the purpose of the content. Content that is intended to be used to market a product, for instance, may need to be shorter and have simpler sentence structure than a peer-reviewed article, even though the audiences that will read the respective content may have the same level of reading skills.

Readability is important for a number of reasons. For instance, since different audiences can have different reading skills, content that is appropriate for an audience with a higher level of reading skill (e.g., 12th grade) may not be easily read and understood by an audience that has a lower level of reading skill (e.g., 6th grade). Conversely, content written for an audience with a 6th grade reading level may not be able to convey the same amount of information as content written for an audience with a 12th grade reading level. On the other hand, it may be important in some situations to communicate with a great amount of impact in few words. For example, an advertisement may need to communicate as much information as possible about a product in a single sentence or paragraph, or content on a web page may need to generate enough interest to entice a user to click on a link before moving on to another page.

Traditionally, an author must simply keep in mind the reading skills of an intended audience and the purpose of the content that is being written. The author must then subjectively determine the readability of the content that is being generated, as it is being generated. It can be very difficult to keep track of the many factors involved in the readability of the content. Consequently, it is likely that the readability of the authored content will not be well targeted to the intended audience, or that the readability will be inconsistent. Some embodiments of the present invention determine the readability of the content that is generated by the author as the content is generated, and readability information is provided to the author so that the author can adjust the readability of the content as it is being created. Other embodiments allow the author or other users to determine the readability of content that was previously created, so that it can be edited as needed to improve its readability or to better target the content to the desired audience, or for the desired purpose.

In some embodiments, these capabilities are provided through the use of a content readability plug-in that is installed in an authoring tool. The content readability plug-in may be used with a number of different authoring tools. The content readability plug-in makes use of various readability indexing techniques, such as the Flesch-Kincade Index, or the Gunning-Fog Index, to determine the readability of the content. Alternative embodiments may use any of a number of available techniques, so references herein to specific readability techniques, indices, libraries, etc. (e.g., Flesch-Kincade, Gunning-Fog, etc.) should be construed as examples, and should not be considered to be limiting of the invention.

An author can provide readability configuration information to the content readability plug-in that identifies a desired level of readability, a type of the content, or an audience for the content. For instance, in some embodiments, the author may explicitly identify a specific level of readability (e.g., by grade level, or by a score on a scale corresponding to the employed readability techniques), or the type of the content (or the audience for the content), from which the plug-in can determine a desired level of readability.

As the author creates content using one of the authoring tool, the content readability system (including, e.g., the content readability plug-in, content readability server, content readability libraries, etc., as will be discussed in more detail below) examines and assesses the readability of the generated content and provides feedback to the author. This feedback may indicates the readability (e.g., via a readability score), and may also provide suggestions for improving the readability of the content. The feedback to the author may be provided in real time as the content is being generated, or the readability techniques may be applied to previously created content.

As noted above, embodiments of the present invention may use any of a number of existing readability techniques that quantify content readability. Two examples of these techniques are the Flesch-Kincade Index and the Gunning-Fog Index. These indices use techniques that involve the examination of textual content to identify metrics of the content associated with readability. For example, they may take into account sentence length, where shorter sentences are considered to be more readable and longer sentences are considered less readable. Other characteristics such as syllable density, word familiarity, word complexity, and the like may also be measured and taken into account by an overall readability index (also referred to herein as a readability score).

In the Flesch-Kincade Index, for instance, various factors may be analyzed to generate an index that ranges from 0-18, with 0 representing the simplest, most readable content, and 18 representing the most complex, least readable content. The Flesch-Kincade index represents a grade level representing the readability of the content (e.g., 3$^{rd}$ grade, 6$^{th}$ grade, etc.) The Flesch-Kincade Index can be calculated as follows:

$$\text{Index}=0.39*(\text{total words}/\text{total sentences})+11.8*(\text{total syllables}/\text{total words})-15.59$$

The Gunning-Fog Index similarly takes various factors into account to generate an index. The Gunning-Fog Index ranges from 0-20, with 0 representing the most readable content, and 20 representing the least readable content. The Gunning-Fog Index can be calculated as follows:

$$\text{Index}=0.4[(\text{total words}/\text{total sentences})+100(\text{complex words}/\text{total words})],$$

where complex words are words that have three or more syllables.

The other indices that may be used in alternative embodiments will have their own formulas for calculating the respective indices. Each of these formulas may take into account various factors, some of which may be common to other indices, and some of which may be different. The various factors and calculations are embodied in code libraries for the respective techniques. Embodiments of the invention may access one or more of these readability code libraries.

In some embodiments, these readability code libraries are accessed by a content readability server. The content readability server provides a content readability interface to the authoring tool which is presented to the user. As content is created in the authoring tool, it is provided by the interface to a content readability server, which analyzes the received content. The content readability server is coupled to the readability libraries and uses the code in one or more of these existing libraries to analyze the received content. The analysis of the text using the code from the libraries produces a readability index that the content readability server can return to the author through the content readability interface.

Additionally, or alternatively, the generated readability index and the analyzed content may be provided to an artificial intelligence (AI) engine (e.g., OpenText Magellan, Google Analytics, etc.). The AI engine can generate suggestions as to how the content may be improved in order to more effectively communicate the desired message to a target audience. The message type and the target audience have preferably already been communicated by the author to the content readability server via the content readability interface, and the content readability server can provide this information to the AI engine. The content suggestions generated by the AI engine are returned to the content readability server, which can in turn provide them to the author via the content readability interface in the authoring tool.

Some embodiments of the present invention can therefore provide immediate, real-time feedback to the author for improvement of the readability of the authored content. For example, when the author types a sentence in an editor that is using this content readability system, the content readability interface provides an output which includes a numerical index corresponding to a created sentence which is generated using the readability index library. The content readability interface also provides one or more suggestions to improve the readability of the sentence. The suggestions may include, for example, “product description is too short”, “focus on value add for customers”, “personalize for target users”, or the like. The specific suggestions may vary according to several factors, such as the type of communication (e.g., advertising copy versus email communications) and the programming of the particular AI engine that is used.

Various embodiments of the invention may provide a number of advantages over the prior art, including, for example, enabling authors to improve readability and content effectiveness in the early stages of a workflow, improving effectiveness of content by maintaining a focus on an intended audience or type of communication, and facilitating these improvements across a wide variety of editors and authoring tools through the use of the content readability plug-in. Many other advantages may also be apparent to those skilled in the art.

Exemplary embodiments of the invention are described below in connection with FIGS. 1-8. These embodiments are intended to be illustrative of the invention rather than limiting.

Referring to FIG. 1, a diagram illustrating the structure of a system for enhancing the readability of content in accordance with some embodiments is shown. In this embodiment, system 100 includes an authoring tool such as a document or content editor 110 which has a content readability plug-in that communicates with content readability server 130 via content readability interface 120. Content readability server 130 is coupled to one or more content readability libraries 140, as well as an AI engine 150.

One or more components of system 100 may be implemented in a content management system, customer communications management system, or any other type of system that provides functionality for editing textual content. The content editing functionality may be provided in a component such as a document or content editor 110. User 160 interacts with content editor 110 to create or modify textual content. This content may be stored in a content repository, content management system, or other data store (not explicitly depicted in the figure) which is coupled to the editor.

Editor 110 as a content readability plug-in that enables the editor to interact with content readability interface 120. The content readability plug-in allows the system to be used with a variety of different editors without having to separately provide editor-specific code for each of the different editors. Instead, the same plug-in can be used to enable the different editors to interact with the content readability system.

The content readability plug-in enables editor 110 to provide configuration information to content readability server 130 via content readability interface 120. This configuration information may include, for example, a target audience, a target reading level, a content type, user preferences and defaults, and the like. The content readability plug-in also enables editor 110 to receive content readability information from content readability interface 120. This information includes, in some embodiments, a readability score and one or more suggestions as to how the readability of the content could be improved (i.e., how the content could be tailored to more closely match the readability to the target audience, content type, etc.).

As noted above, content readability interface 120 enables the user to provide information to content readability server 130, and to receive readability information from the content readability server. Content readability interface 120 is presented in some embodiments as a user interface within editor 110. The user interface may be presented in various different ways, which may include, for example, readability scores that are integrated into the editor's user interface, buttons or links which enable a user to initiate a readability analysis of the content displayed in the editor, dialog boxes, prompts, buttons or other features which enable the user to provide information (e.g., configuration information such as target audience, content type, etc.).

Content readability server 130 is coupled to one or more readability libraries 140 which contain code for readability analysis functions. Readability libraries 140 may include multiple different libraries (e.g., 141-143), each of which may contain code that implements a corresponding readability analysis technique. For instance, as depicted in the figure, content readability server 130 is coupled to a Flesch-Kincade grade level library 141, a Gunning-Fog Index library 142, and an automated readability index library 143. In some embodiments, one of the code libraries can be provided as a default library which is used by the content readability server in the absence of user preferences or instructions to the contrary. As depicted in the figure, Flesch Kincade grade level library 141 is selected as the default library, and the user may select other ones of libraries 140 if desired.

Content readability server 130 is configured to access code libraries 140 to determine a readability score for the content received from editor 110 via content readability interface 120. In some embodiments, code libraries 140 are existing open source libraries that define methods for determining readability. Content readability server may, for example, utilize Texstat, which is a Python package to calculate statistics from text in order to determine readability, complexity, and grade level of the content. Methods from this package such as the following can be used to determine desired readability metrics:

textstat.flesch_reading_ease(text)

textstat.gunning_fog(text)

The textstat.flesch_reading_ease(text) method returns the Flesch Reading Ease Score.

The higher the value of this score, the easier it is for the user to understand the text. The textstat.gunning_fog(text) method returns the FOG index of the text identified in the method call. This is a grade-level formula, where the returned score corresponds to the grade level that is expected to be able to read the document. For instance, a score of 9.3 means that a ninth grader would be able to read the document.

After content readability server 130 obtains a readability score from readability libraries 140, the server provides the readability score, as well as information such as the target audience and communication type to AI engine 150. AI engine 150 uses the received information to generate suggestions for improvement of the readability and effectiveness of the content. In some embodiments, these suggestions are human readable suggestions which communicate ways in which the content could be modified to improve its readability.

AI engine 150 can be any suitable AI engine. For example, in one embodiment, AI engine 150 may use OpenText Magellan, which is an artificial intelligence data analytics platform that has machine learning and predictive analytics capabilities that allow it to analyze content stored on an enterprise data management platform and generate the desired readability suggestions. Alternative embodiments could, of course, use other AI engines. Alternative embodiments could also use systems that might be able to provide the desired suggestions without strictly being considered AI engines. For instance, this component of the system could employ databases or lookup tables to identify suggestions that correspond to preprogrammed combinations of readability score, target audience, communication type, and potentially other input parameters.

AI engine 150 (or an alternative suggestion-generating component) returns the generated suggestions to content readability server 130. Content readability server 130 then provides the readability score and the suggestions generated by AI engine 150 to editor 110 via content readability interface 120. The readability score and suggestions can then be displayed by editor 110 to the user/author so that they can revise the analyzed content if necessary to improve its readability.

The readability score and/or suggestions for improved readability for the authors content may be provided in a variety of ways. Referring to FIG. 2A, an example of a display for an editor using the content readability plug-in in accordance with some embodiments is shown. In this example, a simple editor window 200 is shown. Textual content 210 is entered in the editor window. As noted above, the text may either be created by the author (e.g., typed into the editor window) or previously created content may be retrieved (e.g., a text document created by the author or another user may be accessed, and the text retrieved by the editor). The text in the editor window is provided by the content readability plug-in to the content readability server, which accesses the readability libraries to obtain a readability score. The readability score is returned by the content readability server to the plug-in, and the score 220 is displayed at the bottom of the editor window. In this example, the text entered into the editor window uses simple words with few syllables in relatively short sentences. The low readability score of 1.3 reflects the analysis of the content readability server that the text is suitable for an audience having a low reading level.

Referring to FIGS. 2B-2D, additional examples of readability scores for text entered into the editor window are shown. FIG. 2B shows several sentences that are contained in the same book as the example of FIG. 2A, but these words and sentences are a bit more complex than in the example of FIG. 2A, so the readability score generated for the text is a bit higher than the first example (i.e., the score of 6.1 may indicate that the text is suitable for an audience at a grade level of 6 or higher). In the example of FIGS. 2C and 2D, the content is more complex, and the resulting readability scores are therefore still higher than the previous examples (i.e., 10.7 for the example of FIG. 2C and 11.0 for the example of FIG. 2D).

Figure 3A:
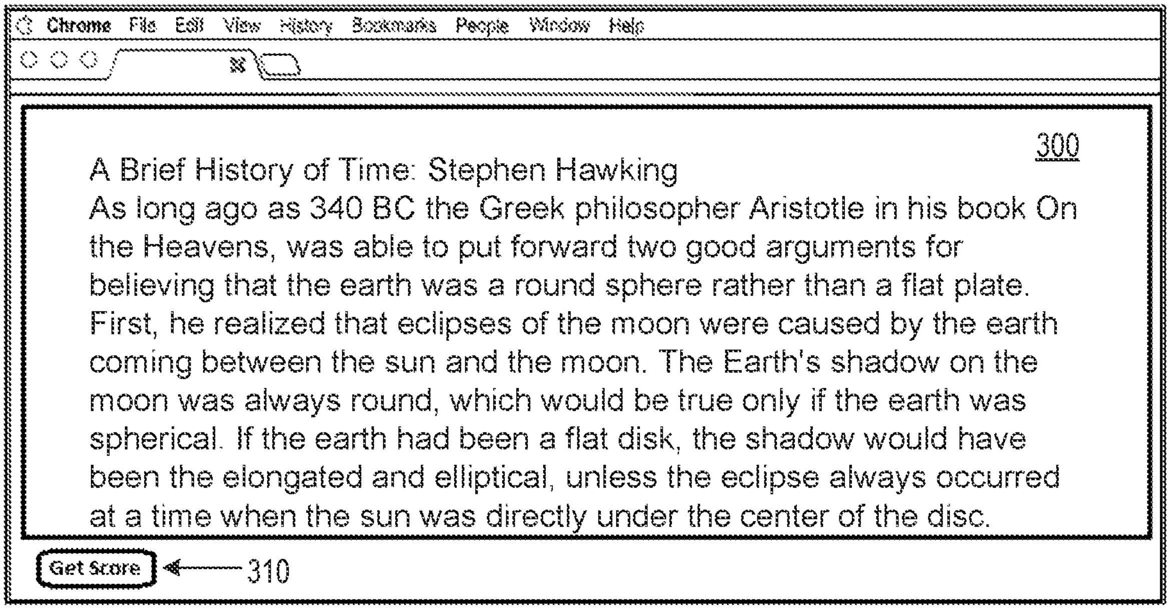
FIGS. 3A-3B are diagrams illustrate an alternative interface for enabling generation of a readability score for content in an editor in accordance with some embodiments.
Figure 3B:
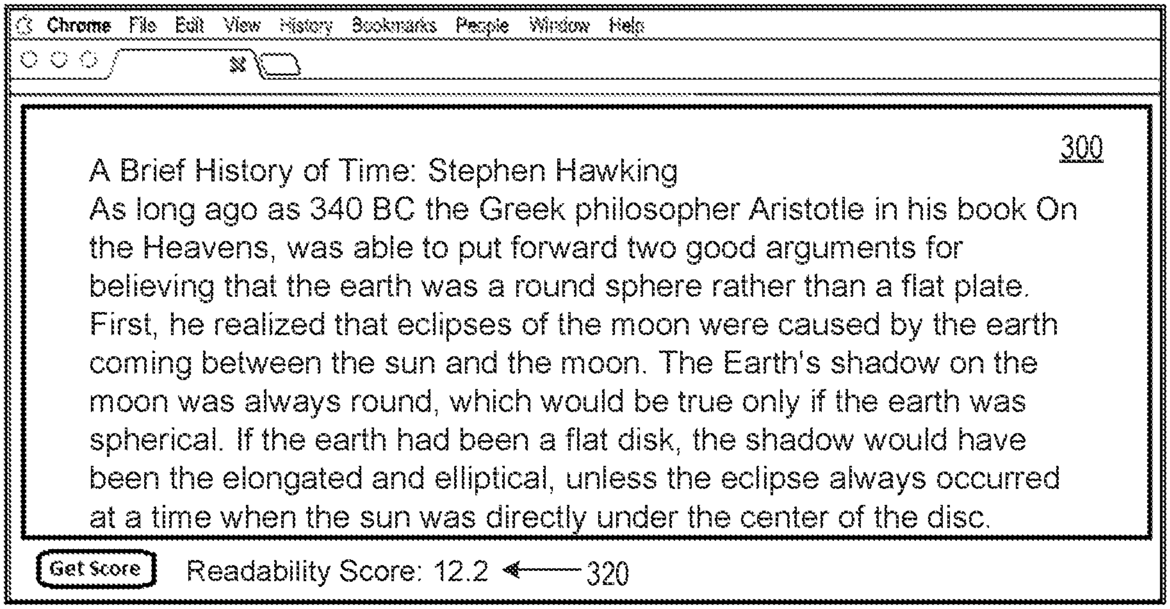

FIGS. 3A and 3B illustrate an alternative interface for enabling generation of a readability score for content in an editor in accordance with some embodiments. In the interface of FIGS. 3A and 3B, textual content is entered via editor window 300, or is retrieved into the editor window. In this embodiment, the content readability system does not automatically initiate a content readability analysis when the content is created or retrieved. Instead, a button or link 310 is provided at the bottom of editor window 300, and the author/user can click on this button (or select the link) to initiate a readability analysis of the content that is contained in editor window 300. When the author/user clicks on button 310, the content is provided by the content readability plug-in to the content readability server, which accesses the readability libraries to generate a readability score. The content readability server then returns the readability score to the editor, and the score 320 is presented below editor window 300 as shown in FIG. 3B.

Figure 4A:
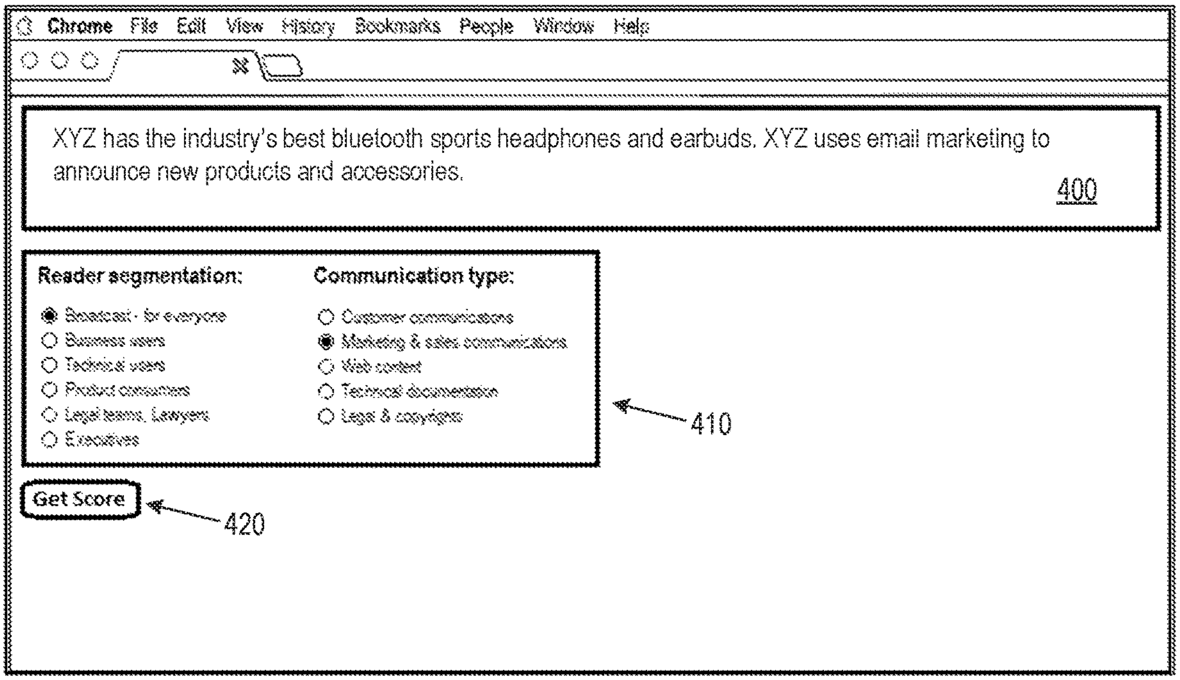
FIGS. 4A-4B are diagrams illustrating another alternative embodiment for enabling the readability analysis of content in accordance with some embodiments
Figure 4B:
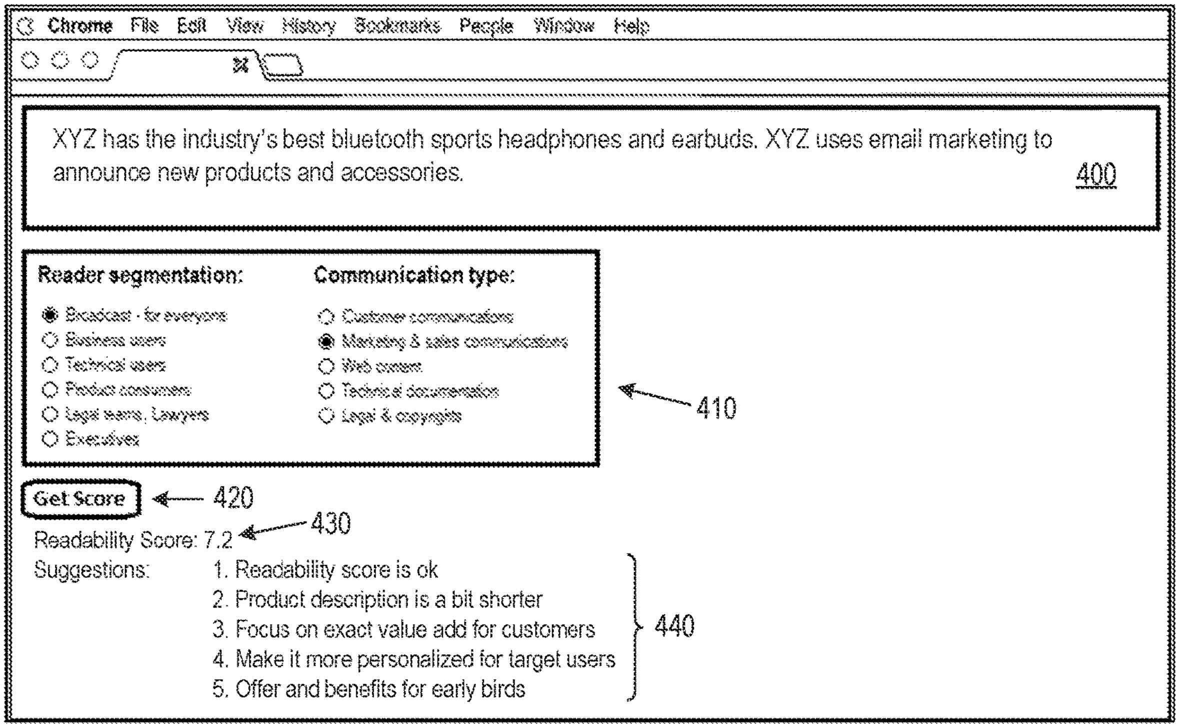

Referring to FIGS. 4A and 4B, another alternative embodiment for enabling the readability analysis of content is shown. In this embodiment, the content readability plug-in provides an interface as shown in FIG. 4A in which the author/user is prompted to provide input indicating the reader segmentation (target audience) and communication type for which the textual content will be used.

In this embodiment, text is entered or retrieved into editing window 400. Similar to the embodiment of FIGS. 3A and 3B, the content readability system does not automatically trigger a readability analysis of the content. When the author/user has entered/retrieved the desired content into editing window 400 and is ready to proceed with the readability analysis, the author/user selects the desired reader segmentation and communication type using the radio buttons provided in readability analysis configuration window 410. The depicted categories are exemplary, and other embodiments may implement different reader segmentations and/or communication types. The readability system may be configured to initially select defaults for the reader segmentation and communication type, or it may present the configuration window with no default selections indicated. The author/user can proceed using default indications, or can make other selections, as desired. When the author/user is ready to proceed with the analysis, they can click button/link 420, which will initiate the readability analysis.

When the author/user initiates the readability analysis, the content in editor window 400 will be provided via the content readability plug-in and content readability interface to the content readability server. The content readability server will access the readability libraries to determine a readability score associated with the content. The content readability server will, in this embodiment, then provide the readability score and the selected reader segmentation and communication type to the AI engine. The AI engine will use this information to generate order more suggestions for improving the readability of the content, and will return these suggestions to the content readability server. The content readability server will then provide the readability score generated using the readability libraries and the readability suggestions generated by the AI engine to the editor via the content readability interface and content readability plug-in.

As shown in FIG. 4B, the content readability plug-in in this embodiment will provide the score and suggestion information at the bottom of the editor interface, with readability score 430 immediately below button 420, and the readability suggestions 440 below the readability score. The arrangement or presentation of the readability score and readability suggestions may vary in other embodiments.

Figure 5:
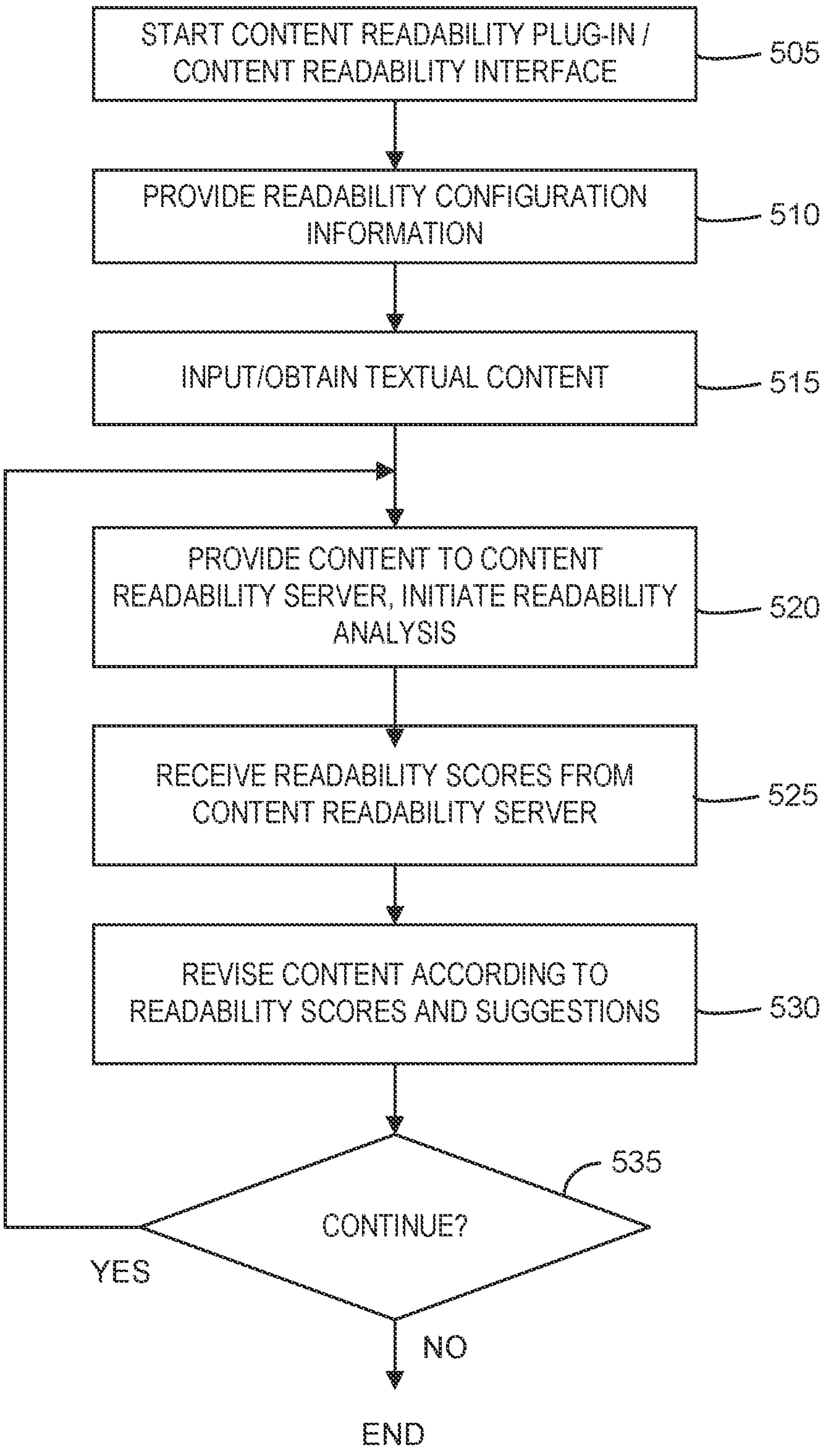
FIG. 5 is a flow diagram illustrating the use of a content readability system in accordance with some embodiments.

Referring to FIG. 5, a flow diagram illustrating the use of the content readability system in accordance with some embodiments is shown. This method is exemplary, and alternative embodiments may use varying methods. The diagram of FIG. 5 illustrates a method from the client side of the system. Initially, the content readability plug-in and content readability interface are launched (505). The plug-in and readability interface may be started when the editor itself is launched. Readability configuration information (e.g., user preferences, target audience, communication type, etc.) may then be provided to the system (510). The content readability system would then be ready to accept textual content for analysis.

In this embodiment, and author/user creates textual content, for example, by typing the content into the editor, cutting and pasting text into the editor, etc. (515). When the content is entered, the plug-in begins the readability analysis by providing the content to the content readability server (520). There may be various triggers which caused the plug-in to initiate the readability analysis. For instance, when a period is entered, the plug-in may initiate an analysis of the sentence preceding the period. Alternatively, the readability analysis may be triggered after a particular number of words have been entered, after a particular interval has elapsed, or upon the occurrence of some other event or set of conditions.

After the content readability server has generated and/or obtained a readability score for the analyzed content and has obtained any desired suggestions to improve the readability of the content, the score and the suggestions are returned to the editor via the content readability plug-in and content readability interface (525). The readability score and suggestions may then be used by the author/user to revise the analyzed content as needed (530). If the author continues to enter text (535), the process returns to step 520, where the new and/or revised content is provided to the content readability server for analysis. This loop may continue while the author/user continues to add to or edit the content. When the author/user completes the editing of the content (535), the readability analysis process terminates.

Figure 6:
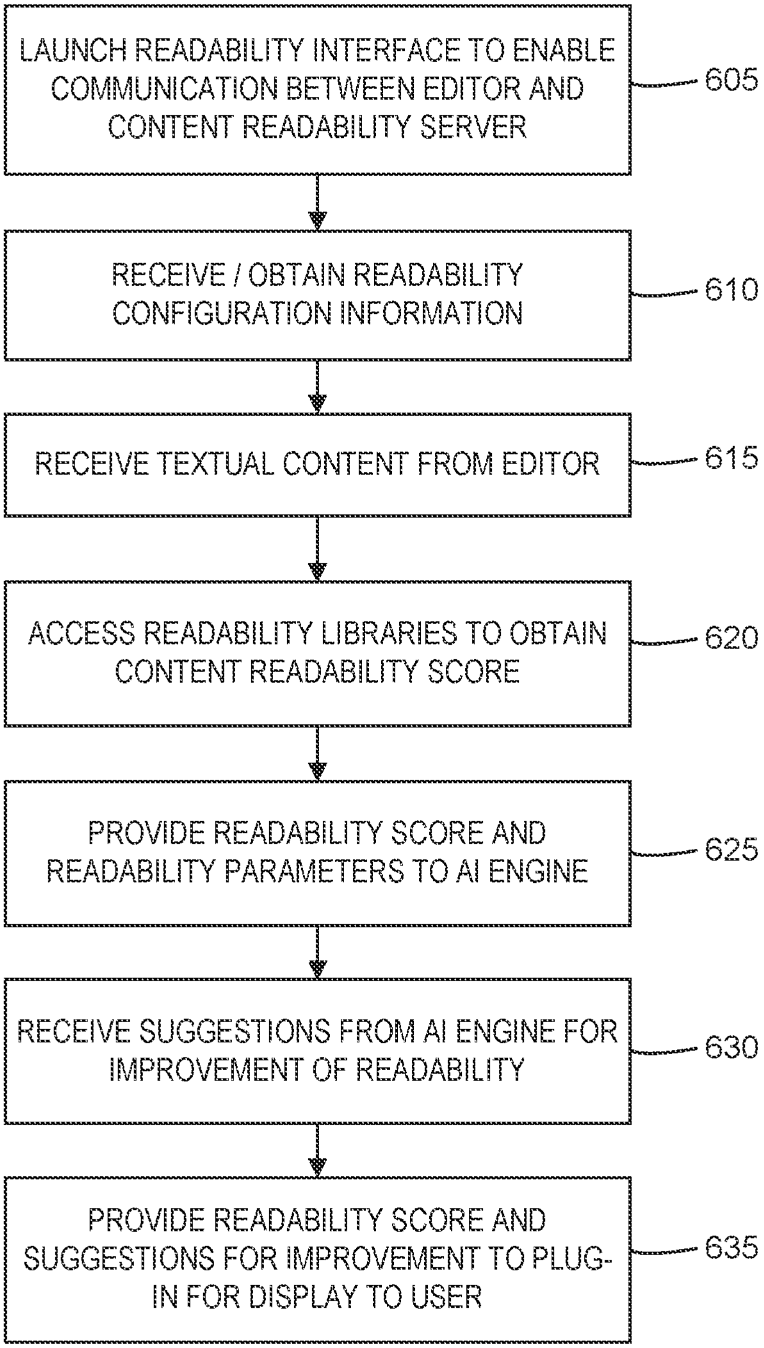
FIG. 6 is another flow diagram illustrating the use of a content readability system in accordance with some embodiments.

Referring to FIG. 6, another flow diagram illustrating the use of the content readability system in accordance with some embodiments is shown. In this case, the diagram illustrates the method from the server side of the system. In this method, a content readability interface is launched to enable communications between the content readability plug-in at the editor and the content readability server (605). The content readability server receives readability configuration information (e.g., user preferences, defaults, target audience, target reading level, communication type, etc.) from the plug-in (610). The content readability server then receives textual content from the editor via the plug-in and readability interface (615). The content readability server then accesses the one or more content readability libraries to determine a readability score for the content (620). This content readability score is provided, along with at least a portion of the readability configuration information (e.g., target audience and communication type) to an AI engine for generation of suggestions to improve the readability of the content (625). The content readability server receives the suggestions generated by the AI engine (630) and provides these suggestions, along with the readability score to the content readability plug-in so that they can be displayed to the author/user (635).

Figure 7:
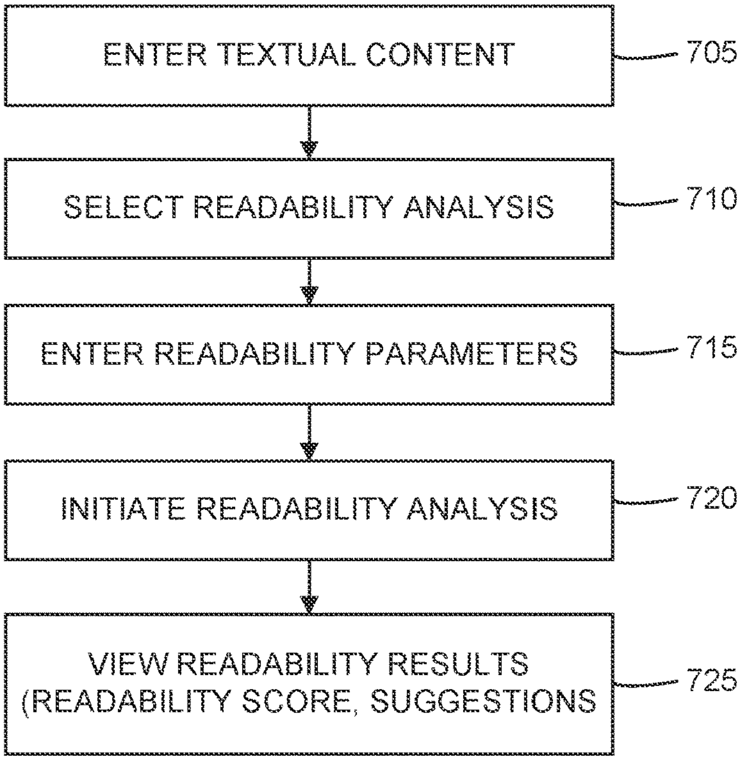
FIG. 7 is a flow diagram illustrating an exemplary method for automatically initiating a readability analysis of entered textual content in accordance with some embodiments.

As noted above in connection with FIG. 5, the readability system may be configured in some embodiments to automatically initiate a readability analysis of entered textual content, either periodically, or in response to a trigger, such as detecting a period at the end of the text. In an alternative embodiment, the readability analysis may be manually initiated by the user. FIG. 7 shows a flow diagram illustrating an example of such an alternative embodiment. As depicted in this figure, and author/user types text into the editor window (705) and then clicks on a button or link to initiate the analysis of the entered text (710). In this embodiment, the plug-in presents the author/user with an interface that allows the author/user to enter readability parameters such as a target audience, communication type, or the like (715). After this information has been provided, the readability analysis is initiated using the provided information (720). The results of the readability analysis (e.g., a readability score and one or more suggestions for improving the readability of the content) are returned to the readability plug-in so that they can be displayed to the author/user (725), who can then edit the analyzed content according to the suggestions to improve its readability.

Figure 8:
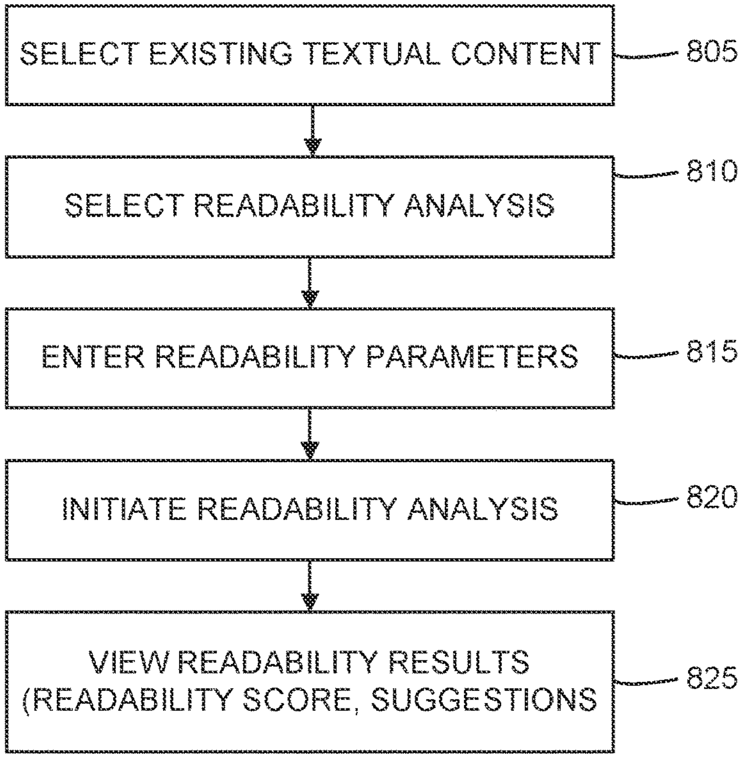
FIG. 8 is a flow diagram illustrating an exemplary method for manually initiating a readability analysis of entered textual content in accordance with some embodiments.

Referring to FIG. 8, another alternative embodiment is shown. In this embodiment, rather than typing text into the editor, the author/user can retrieve existing text from a data store (805). The remainder of the process is substantially the same as in FIG. 7, with the author/user clicking on a button (810) that allows the author/user to enter parameters for the readability analysis (815). The user then initiates the readability analysis with the entered/selected parameters (820), and the results of the analysis are returned by the readability server so that they can be displayed to the author/user (825).

Although the embodiments of FIGS. 7 and 8 include entering content readability analysis parameters as a separate step in the respective processes (e.g., as depicted in FIGS. 4A and 4B), other embodiments may simply initiate the readability analysis using previously entered readability parameters, or default parameters without requiring that the author/user select these parameters prior to initiating the analysis (e.g., as depicted in FIGS. 3A and 3B). Numerous additional variations will also be apparent to those of skill in the art of the invention upon reading this disclosure.

Embodiments of the technology may be implemented on a computing system. Any suitable combination of mobile desktop, server machine, embedded or other types of hardware may be used. One exemplary embodiment may be implemented in a distributed network computing environment. The computing environment in this embodiment may include a client computer system and a server computer system connected to a network (e.g., a local area network (LAN), a wide area network (WAN) such as the Internet, mobile network, or other type of network or combination thereof). The network may represent a combination of wired and wireless networks that network computing environment may utilize for various types of network communications.

The computer systems may include, for example, a computer processor and associated memory. The computer processor may be an integrated circuit for processing instructions, such as, but not limited to a CPU. For example, the processor may comprise one or more cores or micro-cores of a processor. The memory may include volatile memory, non-volatile memory, semi-volatile memory or a combination thereof. The memory, for example, may include RAM, ROM, flash memory, a hard disk drive, a solid-state drive, an optical storage medium (e.g., CD-ROM), or other computer readable memory or combination thereof. The memory may implement a storage hierarchy that includes cache memory, primary memory or secondary memory. In some embodiments, the memory may include storage space on a data storage array. The client computer system may also include input/output ("I/O") devices, such as a keyboard, monitor, printer, electronic pointing device (e.g., mouse, trackball, stylus, etc.), or the like. The client computer system may also include a communication interface, such as a network interface card, to interface with the network.

The memory may store instructions executable by the processor. For example, the memory may include an operating system, a page editing or processing program (e.g., a web browser or other program capable of rendering pages), a server program configured to extend the functionality of the page processing program or other server code. Further, the memory may be configured with a page processable (e.g., capable of being rendered by) by the page editing program. The page may be the local representation of a page, such as a web page, retrieved from the network environment. As will be appreciated, while rendering the page, the page editing/processing program may request related resources, such as style sheets, image files, video files, audio files and other related resources as the page is being rendered and thus, code and other resources of the page may be added to the page as it is being rendered. Application server code can be executable to receive requests from client computers, generate server page files from a set of page assets (e.g., complete web pages, page fragments, scripts or other assets) and return page files in response. A page file may reference additional resources, such as style sheets, images, videos, audio, scripts or other resources at a server computer system or at other network locations, such as at additional server systems.

According to some embodiments, a network environment may be configured with a page such as a web page which is configured to launch and connect to an instance of the server program. The page may include a page file containing page code (HTML or other markup language, scripts or code), stored or generated by the server computer system, that references resources at the server computer system or other network locations, such as additional server computer systems. The page file or related resources may include scripts or other code executable to launch and connect to an instance of the server program.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any, hardware system, hardware mechanism or hardware component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A method for assisting in user targeted content composition by evaluating and improving content readability information, the method comprising:

receiving initial textual content in an authoring tool on a client computer, wherein the authoring tool is one of a plurality of authoring tools;

providing the initial textual content to a content readability plug-in installed in the authoring tool;

providing a request from the content readability plug-in to a content readability server on a server computer, the request identifying the initial textual content;

the content readability server accessing a stored content readability library for assessing an ease of understanding of the initial textual content and generating a content readability index corresponding to the initial textual content;

the content readability server providing input information to an artificial intelligence engine, the input information including the initial textual content, the content readability index and content target readability level information indicating a communication type for a use of the initial textual content, wherein the content target readability level information additionally indicates a target audience from a plurality of target audiences, wherein the target audience has a reading level that differs from other reading levels of the remaining target audiences of the plurality of target audiences;

the artificial intelligence engine analyzing the received input information and, based on the input information, generating a content recommendation corresponding to the initial textual content, wherein the content recommendation is generated based on the received input information to improve readability of the initial textual content for the target readability level information to tailor the readability of the initial textual content according to the reading level of the target audience, wherein the content recommendation is generated based on the received input information, and returning the content recommendation to the content readability server;

the content readability server on the server computer providing the content recommendation to the content readability plug-in of the authoring tool on the client computer; and the content readability plug-in displaying to a user of the authoring tool the content readability index and the content recommendation with the initial textual content, as the initial textual content is being provided to the authoring tool, without further user input, wherein the content readability plug-in is configured to enable the plurality of authoring tools to interact with the content readability server without requiring editor-specific code for the plurality of authoring tools.

2. The method of claim 1, wherein the content readability plug-in automatically displays the content recommendation to the user of the authoring tool in response to the user typing the initial textual content.

3. The method of claim 1, wherein the content recommendation comprises user guidance.

4. The method of claim 1, wherein the content readability plug-in provides a set of user-selectable buttons that are activatable by a user to cause corresponding actions which include one of the group consisting of: replacing the initial textual content with replacement text; adding recommended text to the initial textual content; and editing the initial textual content.

5. The method of claim 1, wherein content target information comprises an indicator of the target audience.

6. The method of claim 1, wherein content target information comprises an indicator of the communication type.

7. The method of claim 1, wherein the content readability library implements one or more of a Flesch-Kincade index and a Gunning-Fog Index.

8. The method of claim 7, wherein the content readability index comprises a numerical value indicative of the initial textual content's readability.

9. The method of claim 1, wherein the content recommendation includes a suggestion specific to the communication type.

10. The method of claim 1, wherein the content readability plug-in generates a readability interface that is presented within an editing interface of the authoring tool.

11. The method of claim 1, wherein the readability interface displays the content readability index of the initial textual content with the corresponding content recommendation.

12. The method of claim 1, wherein user types in the initial textual content via an editing interface of the authoring tool.

13. A system for assisting in user targeted content composition by evaluating and improving content readability information, the system comprising:

a processor;

a content readability plug-in installed in an authoring tool, the content readability plug-in adapted to receive initial textual content, wherein the authoring tool is one of a plurality of authoring tools;

a content readability server coupled to receive a request from the content readability plug-in, the request identifying the initial textual content;

a content readability library coupled to the content readability server, wherein the content readability server is adapted to access the content readability library for assessing an ease of understanding of the initial textual content and generating a content readability index corresponding to the initial textual content;

an artificial intelligence engine coupled to the content readability server, wherein the content readability server is adapted to provide input information to an artificial intelligence engine, the input information including the initial textual content, the content readability index and content target readability level information indicating a communication type for a use of the initial textual content, wherein the content target readability level information additionally indicates a target audience from a plurality of target audiences, wherein the target audience has a reading level that differs from other reading levels of the remaining target audiences of the plurality of target audiences;

the artificial intelligence engine adapted to analyze the received input information and, based on the input information, generating a content recommendation corresponding to the initial textual content, wherein the content recommendation is generated based on the received input information to improve readability of the initial textual content for the target readability level information to tailor the readability of the initial textual content according to the reading level of the target audience, wherein the content recommendation is generated based on the received input information, and return the content recommendation to the content readability server;

the content readability server adapted to provide the content recommendation to the content readability plug-in;

the content readability plug-in adapted to generate a user interface display in the authoring tool containing the content readability index and the content recommendation with the initial textual content, as the initial textual content is being provided to the authoring tool, without further user input, wherein the content readability plug-in is configured to enable the plurality of authoring tools to interact with the content readability server without requiring editor-specific code for the plurality of authoring tools.

14. The system of claim 13, wherein the content readability plug-in automatically displays the content recommendation to the user of the authoring tool in response to the user typing the initial textual content.

15. The system of claim 13, wherein content target information comprises an indicator of the target audience and another indicator of the communication type.

16. The system of claim 13, wherein the content readability plug-in generates a readability interface that is presented within an editing interface of the authoring tool.

17. The system of claim 13, wherein a readability interface displays the content readability index of the initial textual content with the corresponding content recommendation.

18. A computer program product comprising a non-transitory computer-readable medium storing instructions executable by one or more processors to perform:

receiving initial textual content in an authoring tool, wherein the authoring tool is one of a plurality of authoring tools;

providing the initial textual content to a content readability plug-in installed in the authoring tool;

providing a request from the content readability plug-in to a content readability server, the request identifying the initial textual content;

the content readability server accessing a content readability library for assessing an ease of understanding of the initial textual content and generating a content readability index corresponding to the initial textual content;

the content readability server providing input information to an artificial intelligence engine, the input information including the initial textual content, the content readability index and content target readability level information indicating a communication type for a use of the initial textual content, wherein the content target readability level information additionally indicates a target audience from a plurality of target audiences, wherein the target audience has a reading level that differs from other reading levels of the remaining target audiences of the plurality of target audiences;

the artificial intelligence engine analyzing the received input information and, based on the input information, generating a content recommendation corresponding to the initial textual content, wherein the content recommendation is generated based on the received input information to improve readability of the initial textual content for the target readability level information to tailor the readability of the initial textual content according to the reading level of the target audience, wherein the content recommendation is generated based on the received input information, and returning the content recommendation to the content readability server;

the content readability server providing the content recommendation to the content readability plug-in; and the content readability plug-in displaying to a user of the authoring tool the content readability index and the content recommendation with the initial textual content, as the initial textual content is being provided to the authoring tool, without further user input, wherein the content readability plug-in is configured to enable the plurality of authoring tools to interact with the content readability server without requiring editor-specific code for the plurality of authoring tools.

19. The computer program product of claim 18, wherein the content readability plug-in automatically displays the content recommendation to the user of the authoring tool, wherein the user types in the initial textual content via an editing interface of the authoring tool, and wherein the content readability plug-in displays the content recommendation to the user of the authoring tool in response to the user typing the initial textual content.

20. The computer program product of claim 18, wherein content target information comprises an indicator of the target audience and an indicator of communication type.

* * * * *